United States Patent
Marwah et al.

(10) Patent No.: US 12,149,416 B2
(45) Date of Patent: Nov. 19, 2024

(54) HYBRID GRAPH-BASED REPRESENTATION

(71) Applicant: MICRO FOCUS LLC, Santa Clara, CA (US)

(72) Inventors: Manish Marwah, Pleasanton, CA (US); Martin Fraser Arlitt, Calgary (CA)

(73) Assignee: Micro Focus LLC, Santa Clara, CA (US)

(*) Notice: Subject to any disclaimer, the term of this patent is extended or adjusted under 35 U.S.C. 154(b) by 0 days.

(21) Appl. No.: 17/856,704

(22) Filed: Jul. 1, 2022

(65) Prior Publication Data

US 2024/0007356 A1   Jan. 4, 2024

(51) Int. Cl.
*H04L 41/14* (2022.01)
*H04L 41/16* (2022.01)
*H04L 43/08* (2022.01)

(52) U.S. Cl.
CPC ............ *H04L 41/145* (2013.01); *H04L 41/16* (2013.01); *H04L 43/08* (2013.01)

(58) Field of Classification Search
CPC ........ H04L 41/145; H04L 41/16; H04L 43/08
See application file for complete search history.

(56) References Cited

U.S. PATENT DOCUMENTS

| | | | | |
|---|---|---|---|---|
| 11,003,717 | B1* | 5/2021 | Eswaran | G06F 16/21 |
| 2018/0367414 | A1* | 12/2018 | Raghavendra | H04L 43/04 |
| 2020/0067783 | A1* | 2/2020 | Kamath | H04L 41/12 |
| 2020/0092316 | A1* | 3/2020 | Tang | G06F 16/906 |
| 2020/0322368 | A1* | 10/2020 | Cohen | H04L 63/1425 |
| 2020/0342006 | A1* | 10/2020 | Rossi | G06F 16/285 |
| 2021/0067558 | A1 | 3/2021 | Ni | |
| 2021/0176260 | A1* | 6/2021 | Pan | H04L 63/0884 |
| 2021/0243212 | A1 | 8/2021 | Bowman | |
| 2022/0141043 | A1* | 5/2022 | Mauer | H04L 51/04 709/206 |
| 2022/0150123 | A1* | 5/2022 | Kim | G06F 16/9024 |

OTHER PUBLICATIONS

Brody et al; How Attentive are Graph Attention Networks ?; Published as a conference paper at ICLR;2022;26 pages.

(Continued)

*Primary Examiner* — Clayton R Williams
(74) *Attorney, Agent, or Firm* — Sheridan Ross P.C.

(57) ABSTRACT

Network traffic is monitored over a period of time (e.g., network traffic of a corporate network). Based on the monitored network traffic: an abstract temporal graph of the network traffic is generated; graph-based node embeddings of the abstract temporal graph are learned; edge tabular embeddings for edges of the abstract temporal graph are learned; and hybrid embeddings are computed. The computed hybrid embeddings are based on the learned graph-based node embeddings for the abstract temporal graph and the learned edge tabular embedding for the edges of the abstract temporal graph. This process is then repeated over multiple time periods and temporal trajectories are computed using the computed hybrid embeddings for each time period. The temporal trajectories are then used for analysis of the network. For example, the temporal trajectories are used to identify anomalies for prevention of security breaches of the network.

20 Claims, 5 Drawing Sheets

(56) References Cited

OTHER PUBLICATIONS

Chuxu Zhang, et al; Heterogeneous Graph Neural Network; In Proceedings of the 25th ACM SIGKDD International Conference on Knowledge Discovery & Data Mining (KDD '19); Association for Computing Machinery; New York, NY, USA; pp. 793-803; 2019.
Grover, et al; node2vec: Scalable Feature Learning for Networks; Stanford University, KDD, San Francisco, CA; Aug. 13-17, 2016; 10 pages.
Kipf, et al; Semi Supervised Classification with Graph Convolutional Networks; Published as a conference paper at ICLR; 2017; 14 pages.
Li Zheng, et al; AddGraph: Anomaly Detection in Dynamic Graph Using Attention-based Temporal GCN; In Proceedings of the Twenty-Eighth International Joint Conference on Artificial Intelligence, IJCAI-19; International Joint Conferences on Artificial Intelligence Organization; pp. 4419-4425; 2019.
Ng, Andrew, et al. ; On Spectral Clustering: Analysis and an algorithm; Advances in Neural Information Processing Systems; pp. 849-856; 2002.
Petar Velikovičković et al; Graph Attention Networks; Published as a conference paper at ICLR; Department of Computer Science and Technology, University of Cambridge; 2018; 12 pages.
W.L. Hamilton, et al; Inductive representation learning on large graphs; Department of Computer Science, Stanford University; 31st Conf. Neural Information Processing Systems, NIPS; 2017; 11 pgs.
William L. Hamilton; Graph Representation Learning; McGill University; 2020; 2 pages.

\* cited by examiner

HYBRID GRAPH-BASED REPRESENTATION

FIELD

The disclosure relates generally to monitoring and analyzing network traffic and particularly to monitoring network traffic to identify anomalies and/or train a statistical or machine learning model.

BACKGROUND

Systematically extracting actionable information from network traffic data is key in addressing several important cybersecurity problems, such as intrusion and malware detection, and for network management problems, such as application and device identification. A major challenge in building machine learning models for these applications is manually engineering features from network traffic data, which is voluminous, heterogeneous (e.g., may contain Internet Protocol (IP) addresses, Media Access Control (MAC) addresses, port numbers, categorical and numerical values, etc.), and dynamic (e.g., there is a continuous initiation and termination of flows between devices).

SUMMARY

These and other needs are addressed by the various embodiments and configurations of the present disclosure. The present disclosure can provide a number of advantages depending on the particular configuration. These and other advantages will be apparent from the disclosure contained herein.

Network traffic is monitored over a period of time (e.g., network traffic of a corporate network). Based on the monitored network traffic: an abstract temporal graph of the network traffic is generated; graph-based node embeddings of the abstract temporal graph are learned; edge tabular embeddings for edges of the abstract temporal graph are learned; and hybrid embeddings are computed. The computed hybrid embeddings are based on the learned graph-based node embeddings for the abstract temporal graph and the learned edge tabular embedding for the edges of the abstract temporal graph. This process is then repeated over multiple time periods and temporal trajectories are computed using the computed hybrid embeddings for each time period. The temporal trajectories are then used for analysis of the network and entities (e.g., users, machines, etc.) using the network. For example, the temporal trajectories are used to identify anomalies for prevention of security breaches of the network.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6 Accordingly, a claim incorporating the term "means" shall cover all structures, materials, or acts set forth herein, and all of the equivalents thereof. Further, the structures, materials or acts and the equivalents thereof shall include ail those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
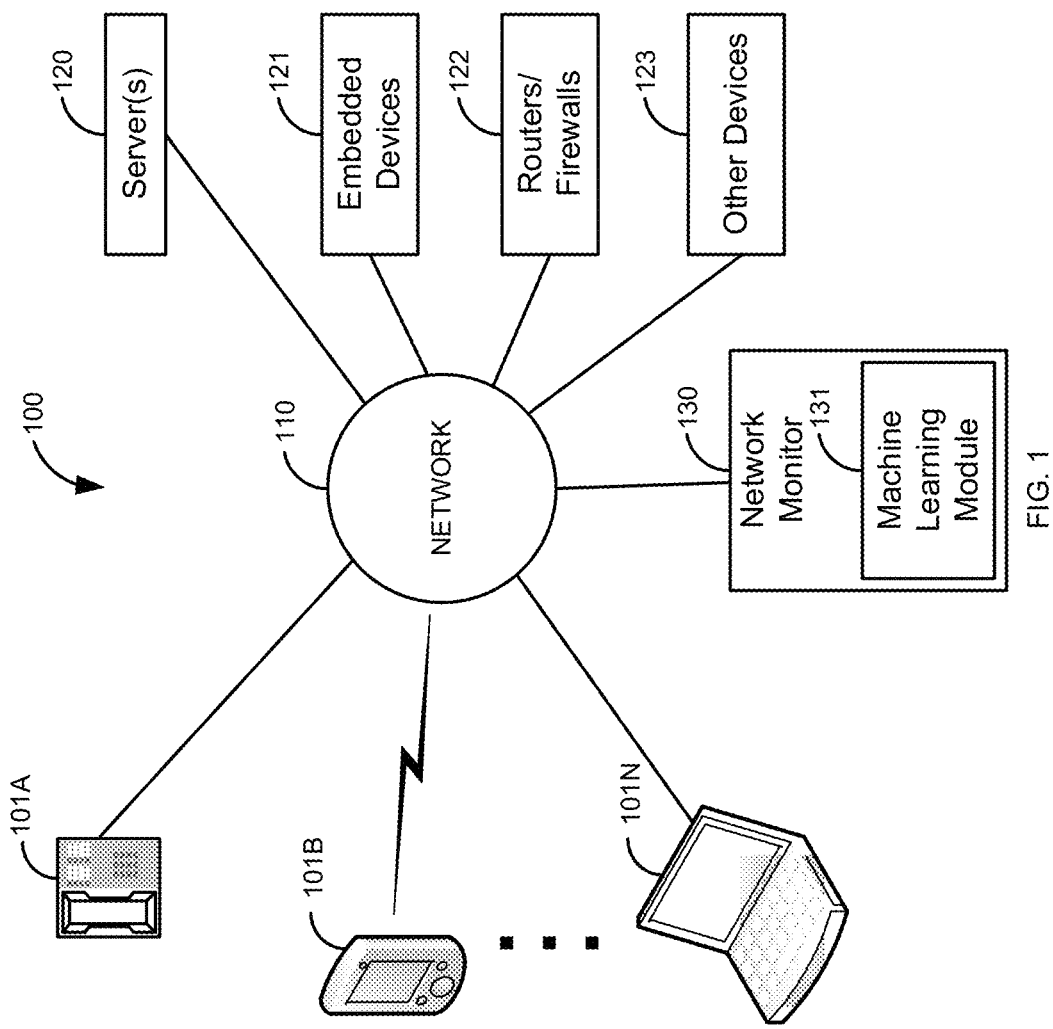
FIG. 1 is a block diagram of a first illustrative system for generating a graph-based network representation for managing a network.

FIG. 1 is a block diagram of a first illustrative system 100 for generating a graph-based network representation for managing a network 110. The first illustrative system 100 comprises communication devices 101A-101N, a network 110, server(s) 120, embedded devices 121, routers/firewalls 122, other devices 123, and a network monitor 130.

The communication devices 101A-101N can be or may include any communication endpoint device that can communicate on the network 110, such as a Personal Computer (PC), a telephone, a video system, a cellular telephone, a Personal Digital Assistant (PDA), a tablet device, a notebook device, a smartphone, and/or the like. The communication devices 101A-101N may communicate with any of the other devices 120-123/130 on the network 110. For example, the communication device 101 may login to the server 120 and then print a document to a printer (an embedded device 121).

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The server(s) 120 may be any hardware coupled with software that can provide services on the network 110, such as, a web server, an application server, a database server, a file server, and/or the like. The server(s) 120 may provide various services to the communication devices 101A-101N, the embedded devices 121, the routers/firewalls 122, and/or the other devices 123. The server(s) 120 may provide services for the network monitor 130. For example, the server(s) 120 may store network data captured by the network monitor 130.

The embedded devices 121 can be or may include any embedded device 121 that can communicate on the network 110, such as, a printer, a scanner, a camera, a sensor, a security device, an Internet-of-Things (IoT) device, an alarm system, and/or the like. The embedded devices 121 may work with any of the devices 101A-101N, 120, 122, 123, and 130.

The routers/firewalls 122 are devices that route packets on the network 110. The routers/firewalls 122 may comprise other devices, such as, a proxy server, a gateway, and/or the like.

The other devices 123 may include any other type of device that can exist on the network 110. For example, the other devices 123 may be a network analyzer.

The network monitor 130 may be any device that is used to monitor the network 110, such as, a network management system. The network monitor 130 may comprise a plurality of devices, such as, network analyzers, and/or the like.

The network monitor 130 further comprises a machine learning module 131. The machine learning module 131 may use a variety of machine learning algorithms in analyzing network traffic captured on the network 110.

Figure 2:
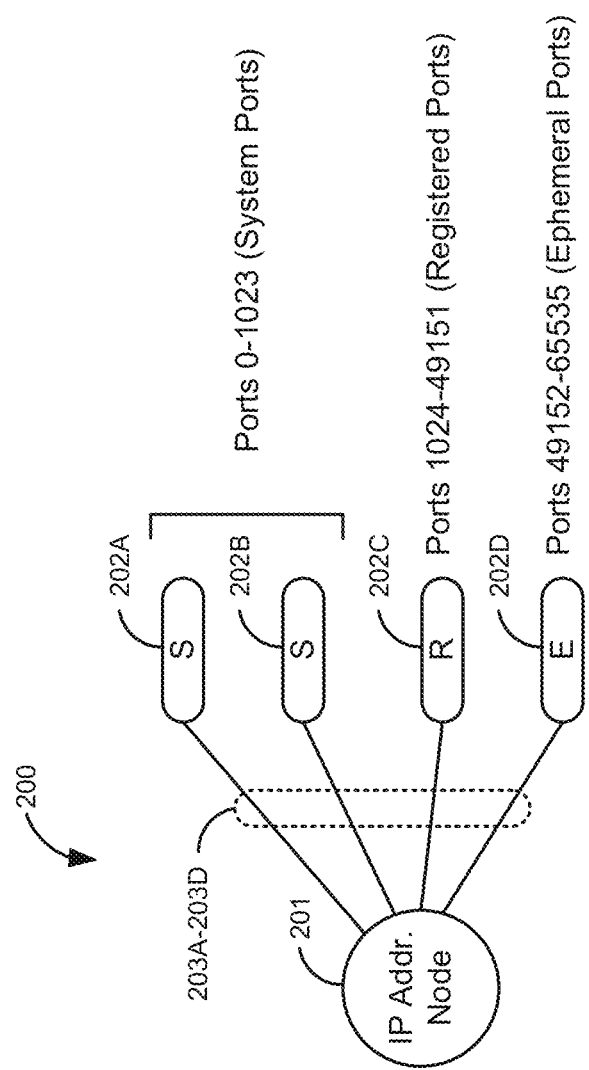
FIG. 2 is a diagram of an exemplary abstract temporal graph for a single IP address.

FIG. 2 is a diagram of an exemplary abstract temporal graph 200 for a single IP address. The abstract temporal graph 200 comprises an Internet Protocol (IP) address node 201 and port nodes 202A-202D. The IP address node 201 has edges 203A-203D. The edges 203A-203D show a connection between the IP address node 201 and the port nodes 202A-202D.

When network traffic is analyzed, there is an inherent graph structure in the network traffic data that corresponds to devices communicating with each other; this can be represented as nodes 201/202A-202D in the abstract temporal graph 200 where the actual communications are displayed as the edges 203A-203D. The abstract temporal graph 200 is different from traditional graphs in that there are typically several attributes associated with nodes 201/202A-202D and with edges 203A-203D. As new communications begin and previous ones end, the abstract temporal graph 200 dramatically changes over time.

Because of the voluminous amount of data generated on the network 110, a user cannot manually sort through the network data and thus, advanced machine learning techniques are necessary to monitor the network traffic in real-time. However, given this complexity, learning representations of network traffic data for machine learning models is also increasing complex. By creating the abstract temporal graph 200, the machine learning process: 1) abstracts network traffic data in the abstract temporal graph 200, 2) learns embeddings over the nodes 201/202; 3) separately learns embeddings for the flow properties between two IP addresses (e.g., IP addresses of hosts), which can be cast as tabular data; 4) combines graph-based embeddings and tabular embeddings to construct a hybrid embedding for flows between two hosts over a time window.

In machine learning, an embedding is a low dimensional, continuous representation of a generally high dimensional, discrete vector. The main advantage an embedding provides is that it has semantic meaning, in the sense that similar entities will have similar embeddings. In other words, if a distance is computed between embeddings of two entities, the distance will indicate a semantic similarity between those two entities. As an example, if IP addresses are represented using one-hot encoding (that is, one bit for each address), for say one million addresses the system would require a vector of length million bits to represent an address. Using dimensionality reduction methods (https://en.wikipedia.org/wiki/Dimensionality_reduction), the system can reduce the dimensionality from one million to say a few hundreds or thousands. This low dimensional representation is called an embedding. There are a large number of dimensionality reduction methods, and they produce embeddings of varying qualities.

Network traffic is usually logged as packets or flows. In either case, each entry typically contains the following attributes: a timestamp, a source IP address, a source port, a destination IP address, a destination port, a transport layer protocol, Transmission Control Protocol (TCP) flags, and a number of bytes. For flows there may be additional details such as a number of packets, a number of flows, and a duration. MAC addresses of the source and destination are other possible attributes that may be used. To abstract this data as a graph the machine learning module 131 first partitions the time sequence into time periods. There are multiple ways to create these time periods. A simple method is to use fixed-interval time periods where the time series is partitioned into blocks of a fixed duration (e.g., 5-minute windows). Each time period can then be converted into the abstract temporal graph 200. The IP addresses and port numbers form the nodes 201/202 in abstract temporal graph 200 while the edges 203A-203D denote communication between these entities. Both the nodes 201/202 and edges 203 can have attributes. For example, an IP address node 201 could be associated with domain names, and/or users if that information is available; a port node 202 could be associated with some aggregate properties of the flows port node 202 is involved in. The edges 203 contain attributes related to the connections.

FIG. 2 shows the IP address node 201 and port nodes 202A-202D are related to the IP address. While there is one IP address node 201, the number of port nodes 202 depend on the ports used in connections with that IP address. The port numbers are considered in three categories: 1) system ports (0 through 1,023)—these have a separate node for each port number used; 2) registered ports (1,024 through 49,151)—these are bucketed together in one node; 3) ephemeral ports (49,152 through 65,535)—these are also bucketed together into one node. Assigning the port numbers in this manner is one way to reduce complexity. Depending on implementation, the port numbers may be categorized in different ways or not categorized at all. If some of the registered ports are considered important in a particular IP address (a host), they can be modeled separately (similar to the system ports). Although potentially each IP address can use more than one thousand port nodes 202, in practice it is likely to be only a few tens of port nodes 202. On the other hand, a busy server may have a lot of active ports in use.

Figure 3:
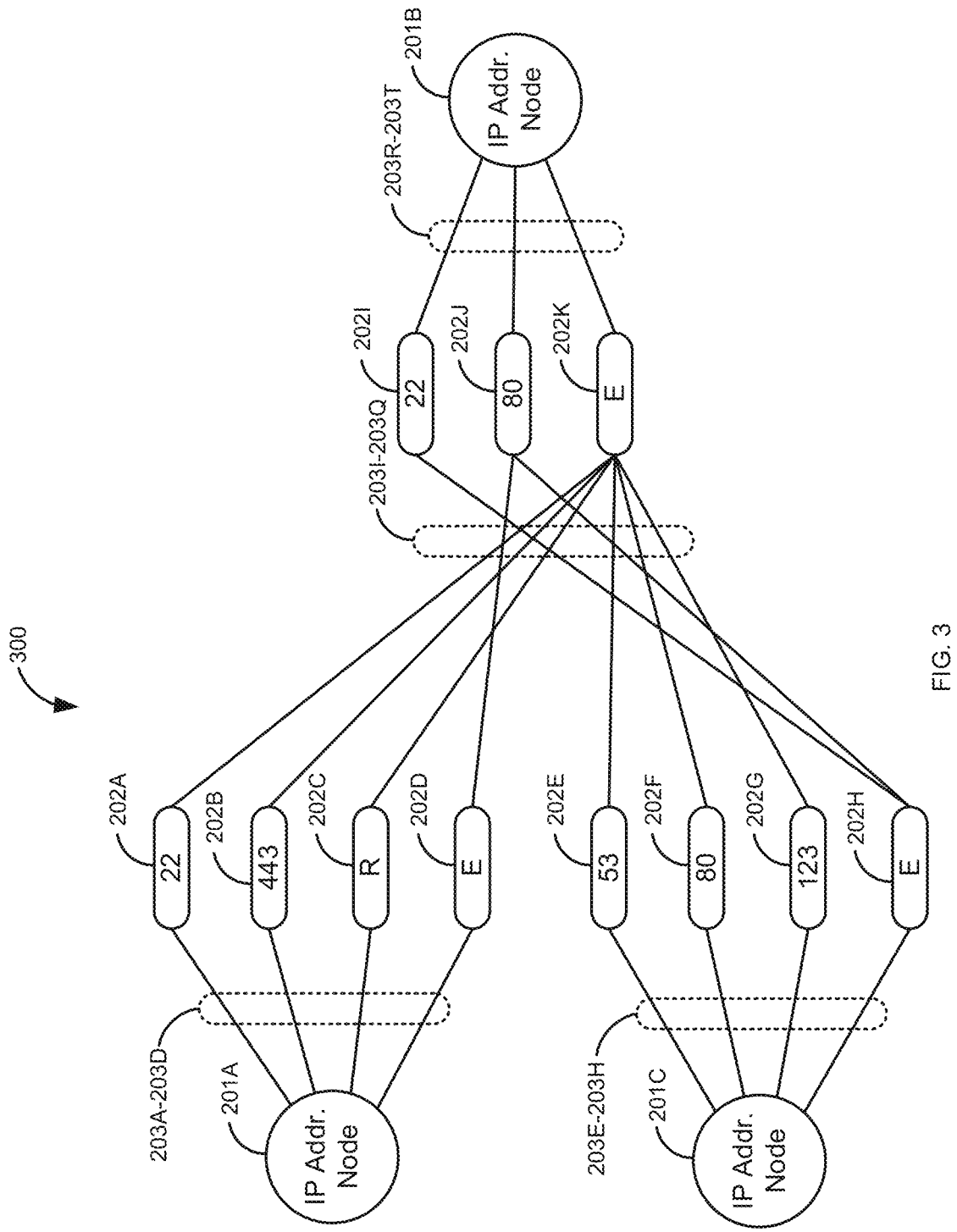
FIG. 3 is a diagram of an exemplary abstract temporal graph for a network.

FIG. 3 is a diagram of an exemplary abstract temporal graph 300 for a network 110. FIG. 3 comprises IP address nodes 201A-201C, port nodes 202A-202K, and edges 203A-203T. FIG. 3 is actually a multi-graph where multiple edges 203 can exist between two IP address nodes 201 corresponding to multiple communications (e.g., communication flows) between the two IP addresses.

FIG. 3 shows the abstract temporal graph 300 of a network traffic data set with several flows between the three IP address nodes 201A-201C. The port nodes (202A, 202B, 202E, 202F, 202G, 202I, and 202J) marked with numbers refer to the port number of the connection. The port nodes (202C, 202D, 202J, and 202K) marked 'R' and 'E' refer to reserved ports and ephemeral ports, respectively. Examples of some of the flows shown in FIG. 3 are: 1) both IP address nodes 201A and 201C use an ephemeral port node 202D/202H to connect to the port node 202J (HTTP port 80) on IP address node 201B; 2) IP address node 201B uses the ephemeral port node 202K to connect to the port node 202A (Secure Shell port 22) on IP address node 201A; and 3) IP address node 201B uses the ephemeral port node 202K to connect to the port node 202E (port 53) on the IP address node 201C.

Figure 4:
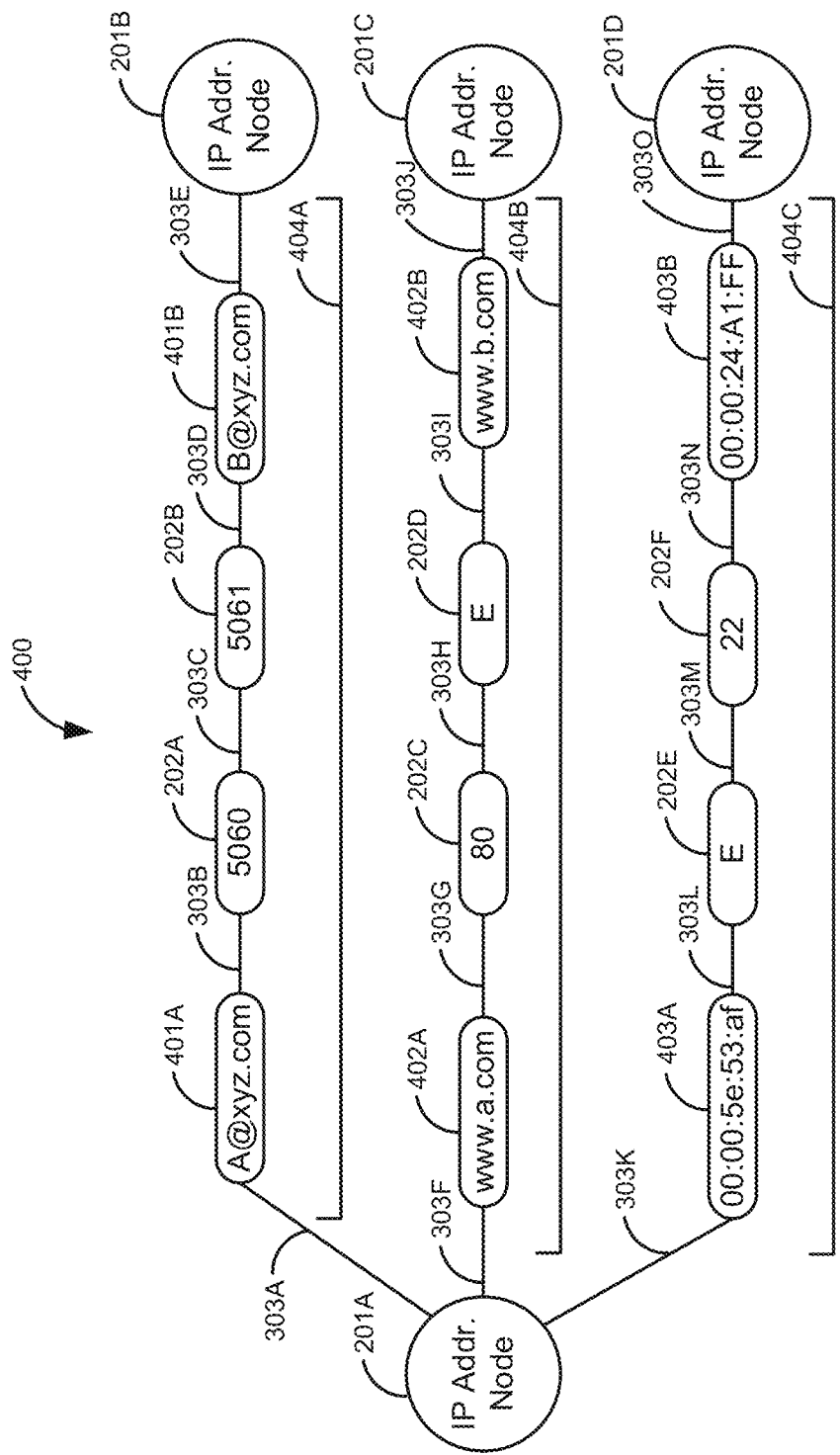
FIG. 4 is a diagram of an exemplary abstract temporal graph wherein various attributes are tracked in the abstract temporal graph.

FIG. 4 is a diagram of an exemplary abstract temporal graph 400 wherein various attributes are tracked in the abstract temporal graph 400. FIG. 4 comprises IP address nodes 201A-201D, port nodes 202A-202F, user address nodes 401A-401B, Uniform Resource Locator (URL) nodes 402A-402B, MAC address nodes 403A-403B, edges 303A-3030, and flows 404A-404C. The abstract temporal graph 400 shows where additional types of nodes 401A-401B, 402A-402C, and 403A-403B can be used to build the abstract temporal graph 400. Although the abstract temporal graph 400 shows the user address nodes 401A-401B, the URL nodes 402A-402B, and the MAC address nodes 403A-403B, other types of nodes may be used based on the type of information being gathered. For example, a Session Initiation Protocol (SIP) address, an H.323 address, a telephone number, an application layer address, a presentation layer address, a transport layer address, a session layer address, a data link layer address, a virtual machine name/address, a container name/address, a micro service name/address, a physical address, a user name, and/or the like may be represented in the abstract temporal graph 400.

The flow 404A comprises the flow from the IP address node 201A to the IP address node 201B. The flow 404A comprises the IP address node 201A, the user address node 401A (e.g., a SIP user address A@xyz.com), port node 202A (port 5060), port node 202B (port 5061), user address node 401B (e.g., a SIP address B@xyz.com), and IP address node 201B. The flow 404B comprises the flow from the IP address node 201A to the URL node 402A (www.a.com), the port node 202C (HTTP port 80), the ephemeral port node 202D, the URL node 402B (www.b.com), and the IP address node 201C. The flow 404C comprises the flow from the IP address node 201A to the MAC address node 403A, the ephemeral port node 202E, the port node 202F (port 22), the MAC address node 403B, and the IP address node 201D.

In one embodiment the abstract temporal graph 200/300/400 may be displayed to a user. For example, a data scientist implementing these methods could incorporate suggestions from a domain expert in constructing the abstract temporal graph 200/300/400 from the data. In another embodiment, the abstract temporal graph 200/300/400 is not displayed to a user, but instead is used internally by the machine learning module 131.

Figure 5:
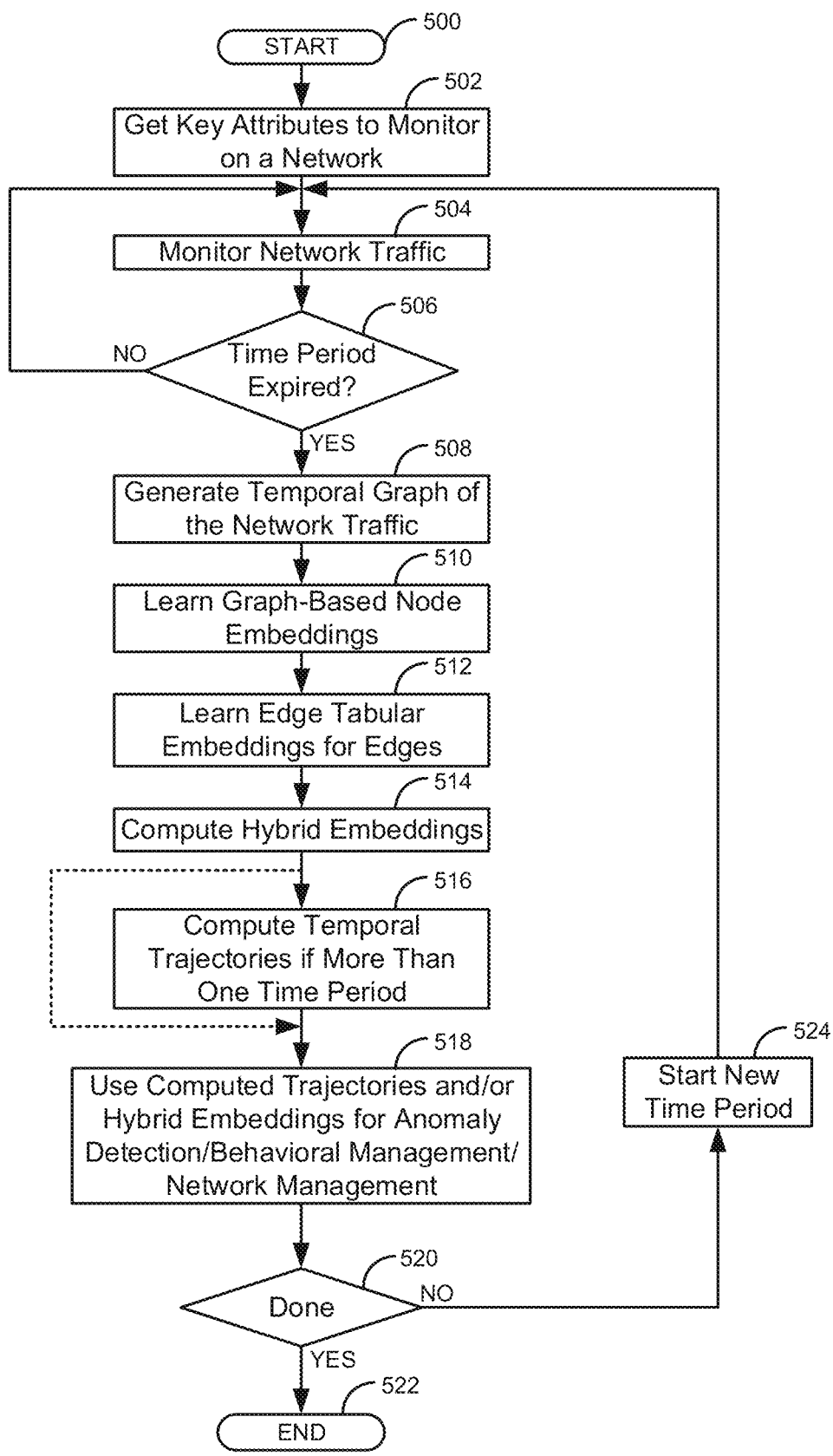
FIG. 5 is a flow diagram of a process for generating an abstract temporal graph for managing a network.

FIG. 5 is a flow diagram of a process for generating an abstract temporal graph (200/300/400) for managing a network 110. Illustratively, the communication devices 101A-101N, the server(s) 120, the embedded devices 121, the routers/firewalls 122, the other devices 123, and a network monitor 130 are stored-program-controlled entities, such as a computer or microprocessor, which performs the method of FIG. 5 and the processes described herein by executing program instructions stored in a computer readable storage medium, such as a memory (i.e., a computer memory, a hard disk, and/or the like). Although the method described in FIG. 5 is shown in a specific order, one of skill in the art would recognize that the steps in FIG. 5 may be implemented in different orders and/or be implemented in a multi-threaded environment. Moreover, various steps may be omitted or added based on implementation.

The process starts in step 500. The network monitor 130 gets key attributes to monitor on the network 110 in step 502. The key attributes may be received via a user interface in the network monitor 130 or via one of the communication devices 101. The key attributes may vary based on what a user is trying to accomplish. For example, as shown in FIG. 3, the user may want to monitor the use of ports between different hosts on a network 110 by monitoring the host IP addresses. Alternatively, the user may want to monitor URLs/ports between the hosts as shown in flow 404B. The user may want to monitor SIP addresses/ports between the hosts using the hosts IP addresses as shown in flow 404A. The user may want to monitor MAC addresses/IP addresses and ports as shown in flow 404C. Alternatively, instead of using IP addresses/ports, the user may want to look at MAC addresses and SIP user addresses and not look at IP addresses/ports. As one can see, various combinations of the key attributes may be used to build the abstract temporal graph 200/300/400 depending on implementation.

In addition to the input from the user, the key attributes may be extracted from raw packet data (e.g., raw packets or packet flows). Alternatively, the key attributes may be identified from grouped/ungrouped flows where the key attributes are extracted from flow summaries. In addition, the process could work with an aggregation of flows and/or subsampling of raw packets or packet flows.

The network monitor 130 monitors the network traffic in step 504. The network monitor 130 may monitor the network 110 in various ways. For example, the network monitor 130 may have various types of network analyzers that capture packets on different segments of the network 110. The network monitor 130, determines, in step 506, if a time period has expired. The time period may be user defined based on implementation. For example, the network monitor 130 may capture packets on ten-minute intervals. If the time period has not expired in step 506, the process goes back to step 504 to continue monitoring the network traffic on the network 110.

Otherwise, if the time period has expired in step 506, the network monitor 130 generates, in step 508, the abstract temporal graph 200/300/400 of the network traffic. The abstract temporal graph 200/300/400 is generated based on the key attributes from step 502. Alternatively, the temporal graph 200/300/400 may be generated in real-time as each packet/flow is received. When the time period expires, the temporal graph 200/300/400 is finalized.

The machine learn module 131 learns graph-based node embeddings in step 510. Having abstracted a network traffic data set as the abstract temporal graph 200/300/400, the machine learn module 131 learns embeddings for each of the nodes (e.g., the nodes 201A-201C/202A-202K in FIG. 3). In one embodiment, there may be three main categories of methods to learn the embeddings: 1) spectral methods via spectral decomposition (e.g., see Ng, Andrew Y., Michael I. Jordan, and Yair Weiss. "On Spectral Clustering: Analysis and an algorithm." Advances in Neural Information Processing Systems 2 (2002): 849-856); 2) random walk methods (e.g., see node2vec: Scalable Feature Learning for Networks (2016), by Grover and Leskovec), and Graph Neural Networks (GNN) (e.g., see William L. Hamilton. 2020. Graph Representation Learning. Synthesis Lectures on Artificial Intelligence and Machine Learning 14, 3 (2020), 1-159). In one example, the embeddings are learned using a GNN. A GNN has layer-wise parameters (weights) that are learned during training. Once trained, a GNN may output k-dimensional embeddings for each node (e.g., nodes 201/202/401/402/403) in a given abstract temporal graph 200/300/400. These embeddings encode properties derived from the abstract temporal graph 200/300/400 for each host/IP address and port number (assuming IP addresses/port number were selected in step 502). The training process may involve two steps: 1) aggregating embeddings from neighbors, and 2) transforming the input using a weight matrix and a non-linear function. The choice of aggregating function and the transformation function determines the particular GNN variant. The number of layers in a GNN determines neighbors at what depth impact the embedding at a particular node 201/202/401/402/403 (e.g., if a GNN has v-layers then neighbors up to p hops away will influence a node embedding in the abstract temporal graph 300/400). During training, the machine learning module 131 uses an unsupervised loss function or a self-supervised loss function since it is not assumed that there is an availability of any labels for the network traffic data. Based on the time period selected, a series of abstract temporal graphs 300/400 is produced. The machine learning module trains a GNN over a large number of abstract temporal graphs 300/400, and then periodically re-trains itself. For a new abstract temporal graph 300/400, given a trained GNN, the machine learning module 131 can compute a k-dimensional embedding for each of the IP address nodes 201 and port nodes 202.

The machine learning module 131 learns the edge tabular embeddings in step 512. An edge 203 in the abstract temporal graph 300/400 represents all the flows 404 between the connecting nodes (e.g., the IP address nodes 201) during the time period, which can be considered as tabular data consisting of flow properties such as transport layer protocol, a number of bytes, a number of packets, TCP flags, etc. The machine learning module 131 derives an embedding for these properties (which exclude the IP address and port number) associated with flows 404 for each edge 203. Several methods could be used for computing embedding for the tabular data. In one embodiment, the machine learning module 131 uses an autoencoder for this purpose. During training, the autoencoder takes these properties as input and tries to minimize the reconstruction error. A trained autoencoder can be used to compute a k-dimensional embedding representing the aforementioned flow properties.

The machine learning module 131 computes the hybrid embedding in step 514. To compute the hybrid embedding for an edge 203 in the abstract temporal graph 200/300/400, which, for example, would correspond to flows 404 between two hosts over a time period, the machine learning module 131 collates embeddings computed in steps 510/512. For example, flows 404 between nodes i and j, using ports $p_i$ and $p_j$ with embeddings $Z_i$, $Z_j$, $Z_{pi}$ and $Z_{pj}$ respectively, and flow properties embedding as $Z_{pi,pj}$ the hybrid flow embedding, $Z_{ij}$ will be:

$$Z_{ij} = Z_i \odot Z_j \odot Z_{pi} \odot Z_{pj} \odot Z_{pi,pj}$$

where the $\odot$ operator indicates some form of element-wise aggregation including one of concatenation, summation, multiplication, Hadamard product, and/or the like. $Z_{ij}$ is a k-dimensional embedding representing the flow 404 between nodes i and j over a time period that can be used as an input to any downstream machine learning models for tasks related to cybersecurity, anomaly detection, behavior management, service management, and/or the like.

The output of the computed hybrid embeddings may be input, in step 516, into various types of machine learning algorithms based on implementation. In one embodiment, the output of the computed hybrid embeddings may be used to compute temporal trajectories of the hybrid embeddings. The hybrid embedding $Z_{ij}$ computed in the step 514 is for a specific time period and is therefore more aptly represented as $Z_{ijt}$, that is, the embedding between nodes i and j during time period t. The machine learning module 131 tracks each Z over time to determine how the behavior of different flows 404 evolves. A simple measure of change will be to compute:

$$d_{ijt} = I_p(Z_{ijt}, Z_{ijt-1})$$

where $I_p$ is the p-norm distance between successive embeddings of nodes i and j. A change above a threshold may indicate anomalous behavior. A time-series of the change values could be saved and any of the time-series anomaly detection methods/algorithms can be used to detect abnormal values. The aggregate value of the change, that is, $\Sigma_{ij} d_{ijt}$, may provide an indication of the need for retraining the GNN and autoencoder models. The computed trajectories can then be used, based on the input attributes of step 502, in various ways, such as, anomaly detection, behavior management, network management, and/or the like in step 518. In an alternative embodiment, the hybrid embeddings computed for a particular time window in step 514 can be directly applied as indicated by the dashed line from step 514 to step 518. For example, an application can directly take the computed hybrid embeddings from step 514 and use it for anomaly detection, network management, etc. in step 518 without computing the temporal trajectories of step 516.

The network monitor 130, determines, in step 520, if the process is complete. If the process is not complete in step 520, the process starts a new time period in step 524. The process then goes back to step 504 to monitor the network traffic for a new time period. Otherwise, if the process is complete in step 520, the process ends in step 522.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJS™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   a microprocessor; and
   a computer readable medium, coupled with the microprocessor and comprising microprocessor readable and executable instructions that, when executed by the microprocessor, cause the microprocessor to:
   monitor first network traffic over a first period of time; and
   based on the monitored first network traffic:
   generate a first abstract temporal graph of the first network traffic;
   learn first graph-based node embeddings of the first abstract temporal graph;
   learn first edge tabular embeddings for edges of the first abstract temporal graph; and
   compute first hybrid embeddings,
   wherein the computed first hybrid embeddings are based on the learned first graph-based node embeddings for the first abstract temporal graph and the learned first edge tabular embedding for the edges of the first abstract temporal graph,
   wherein the first abstract temporal graph comprises a plurality of nodes and a plurality of edges,
   wherein the plurality of nodes comprises a plurality of IP address nodes (i) and a plurality of port number nodes (j),
   wherein computing the first hybrid embeddings uses the following algorithm:

$Z_{ij} = Z_i \odot Z_j \odot Z_{pi} \odot Z_{pj} \odot Z_{pi,pj}$, wherein flows between nodes in the first abstract temporal graph are for flows between the IP address nodes i and the port number nodes j, using ports $p_i$ and $p_j$ with embeddings $Z_i$, $Z_j$, $Z_{pi}$ and $Z_{pj}$ and
   wherein where the $\odot$ operator indicates some form of element-wise aggregation including one of: concatenation, summation, multiplication, and a Hadamard product.

2. The system of claim 1, wherein the microprocessor readable and executional instructions further cause the microprocessor to:
   monitor second network traffic over a second period of time;
   based on the monitored second network traffic:
   generate a second abstract temporal graph of the second network traffic;

learn second graph-based node embeddings of the
second abstract temporal graph;
learn second edge tabular embeddings for edges of the
second abstract temporal graph; and
compute second hybrid embeddings,
wherein the computed second hybrid embeddings are
based on the learned second graph-based node
embeddings for the second abstract temporal graph
and the learned second edge tabular embedding for
the edges of the second abstract temporal graph; and
compute temporal trajectories using the first hybrid
embeddings and the second hybrid embeddings.

3. The system of claim 2, wherein the computed temporal trajectories are used to do at least one of: anomaly detection, behavior characterization, user identification, device identification, and application identification.

4. The system of claim 1, wherein the first abstract temporal graph is generated based one or more of: an IP address, a Media Access Control (MAC) address, a Uniform Resource Locator (URL), a Session Initiation Protocol (SIP) address, a Transmission Control Protocol (TCP) flag, an H.323 address, a telephone number, an application layer address, a presentation layer address, a transport layer address, a session layer address, a data link layer address, a virtual machine, a container, a micro service, and a physical address.

5. The system of claim 1, wherein the plurality of IP address nodes (i) and the plurality of edges each have one or more associated attributes.

6. The system of claim 1, wherein the first abstract temporal graph is not generated for display to a user.

7. The system of claim 1, wherein the microprocessor readable and executional instructions further cause the microprocessor to: get one or more key attributes from a user interface, wherein the one or more key attributes are used to generate the first abstract temporal graph.

8. The system of claim 1, wherein edges of the plurality of edges are provided between IP address nodes (i) of the plurality of IP address nodes (i) and port number nodes (j) of the plurality of port number nodes (j),
wherein the edges are provided between the port number nodes (j) of the plurality of port number nodes (j) and
wherein the edges of at least one port number node (j) of the plurality of port number nodes (j) are provided between multiple port number nodes (j) of the plurality of port number nodes (j) of multiple IP address nodes (i) of the plurality of IP address nodes (i).

9. A method, comprising:
monitoring, by a microprocessor, first network traffic over a first period of time; and
based on the monitored first network traffic:
generating, by the microprocessor, a first abstract temporal graph of the first network traffic;
learning, by the microprocessor, first graph-based node embeddings of the first abstract temporal graph;
learning, by the microprocessor, first edge tabular embeddings for edges of the first abstract temporal graph; and
computing, by the microprocessor, first hybrid embeddings,
wherein the computed first hybrid embeddings are based on the learned first graph-based node embeddings for the first abstract temporal graph and the learned first edge tabular embedding for the edges of the first abstract temporal graph,
wherein the first abstract temporal graph comprises a plurality of nodes and a plurality of edges,
wherein the plurality of nodes comprises a plurality of IP address nodes (i) and a plurality of port number nodes (j),
wherein computing the first hybrid embeddings uses the following algorithm:

$$Z_{ij} = Z_i \odot Z_j \odot Z_{pi} \odot Z_{pj} \odot Z_{pi,pj},$$

wherein flows between nodes in the first abstract temporal graph are for flows between the IP address nodes i and the port number nodes j, using ports $p_i$ and $p_j$ with embeddings $Z_i$, $Z_j$, $Z_{pi}$ and $Z_{pj}$ and
wherein where the $\odot$ operator indicates some form of element-wise aggregation including one of: concatenation, summation, multiplication, and a Hadamard product.

10. The method of claim 9, further comprising:
monitoring, by the microprocessor, second network traffic over a second period of time;
based on the monitored second network traffic:
generating, by the microprocessor, a second abstract temporal graph of the second network traffic:
learning, by the microprocessor, second graph-based node embeddings of the second abstract temporal graph;
learning, by the microprocessor, second edge tabular embeddings for edges of the second abstract temporal graph; and
computing, by the microprocessor, second hybrid embeddings,
wherein the computed second hybrid embeddings are based on the learned second graph-based node embeddings for the second abstract temporal graph and the learned second edge tabular embedding for the edges of the second abstract temporal graph; and
compute temporal trajectories using the first hybrid embeddings and the second hybrid embeddings.

11. The method of claim 10, wherein the computed temporal trajectories are used to do at least one of: anomaly detection, behavior characterization, user identification, device identification, and application identification.

12. The method of claim 9, wherein the first abstract temporal graph is generated based one or more of: an IP address, a Media Access Control (MAC) address, a Uniform Resource Locator (URL), a Session Initiation Protocol (SIP) address, a Transmission Communication Protocol (TCP) flag, an H.323 address, a telephone number, an application layer address, a presentation layer address, a transport layer address, a session layer address, a data link layer address, a virtual machine, a container, a micro service, and a physical address.

13. The method of claim 9, wherein the plurality of IP address nodes (i) and the plurality of edges each have one or more associated attributes.

14. The method of claim 9, wherein edges of the plurality of edges are provided between IP address nodes (i) of the plurality of IP address nodes (i) and port number nodes (j) of the plurality of port number nodes (j),
wherein the edges are provided between the port number nodes (j) of the plurality of port number nodes (j) and
wherein the edges of at least one port number node (j) of the plurality of port number nodes (j) are provided between multiple port number nodes (j) of the plurality of port number nodes (j) of multiple IP address nodes (i) of the plurality of IP address nodes (i).

15. A non-transient computer readable medium having stored thereon instructions that cause a microprocessor to execute a method, the method comprising:
instructions to:
monitor first network traffic over a first period of time; and based on the monitored first network traffic:
generate a first abstract temporal graph of the first network traffic;
learn first graph-based node embeddings of the first abstract temporal graph;
learn first edge tabular embeddings for edges of the first abstract temporal graph; and compute first hybrid embeddings,
wherein the computed first hybrid embeddings are based on the learned first graph-based node embeddings for the first abstract temporal graph and the learned first edge tabular embedding for the edges of the first abstract temporal graph,
wherein the first abstract temporal graph comprises a plurality of nodes and a plurality of edges,
wherein the plurality of nodes comprises a plurality of IP address nodes (i) and a plurality of port number nodes (j),
wherein computing the first hybrid embeddings uses the following algorithm:

$$Z_{ij}=Z_i \odot Z_j \odot Z_{pi} \odot Z_{pj} \odot Z_{pi,pj},$$

wherein flows between nodes in the first abstract temporal graph are for flows between the IP address nodes i and the port number nodes j, using ports $p_i$ and $p_j$ with embeddings $Z_i$, $Z_j$, $Z_{pi}$ and $Z_{pj}$ and
wherein where the $\odot$ operator indicates some form of element-wise aggregation including one of: concatenation, summation, multiplication, and a Hadamard product.

16. The non-transient computer readable medium of claim 15, wherein the instructions further cause the microprocessor to:
monitor second network traffic over a second period of time;
based on the monitored second network traffic:
generate a second abstract temporal graph of the second network traffic;
learn second graph-based node embeddings of the second abstract temporal graph;
learn second edge tabular embeddings for edges of the second abstract temporal graph; and
compute second hybrid embeddings,
wherein the computed second hybrid embeddings are based on the learned second graph-based node embeddings for the second abstract temporal graph and the learned second edge tabular embedding for the edges of the second abstract temporal graph; and
compute temporal trajectories using the first hybrid embeddings and the second hybrid embeddings.

17. The non-transient computer readable medium of claim 16, wherein the computed temporal trajectories are used to do at least one of: anomaly detection, behavior characterization, user identification, device identification, and application identification.

18. The non-transient computer readable medium of claim 15, wherein the first abstract temporal graph is generated based one or more of: an IP address, a Media Access Control (MAC) address, a Uniform Resource Locator (URL), a Session Initiation Protocol (SIP) address, a Transmission Control Protocol (TCP) flag, an H.323 address, a telephone number, an application layer address, a presentation layer address, a transport layer address, a session layer address, a data link layer address, a virtual machine, a container, a micro service, and a physical address.

19. The non-transient computer readable medium of claim 15, wherein the plurality of IP address nodes (i) and the plurality of edges each have one or more associated attributes.

20. The non-transient computer readable medium of claim 15, wherein edges of the plurality of edges are provided between IP address nodes (i) of the plurality of IP address nodes (i) and port number nodes (j) of the plurality of port number nodes (j),
wherein the edges are provided between the port number nodes j of the plurality of port number nodes (j) and
wherein the edges of at least one port number node (j) of the plurality of port number nodes (j) are provided between multiple port number nodes (j) of the plurality of port number nodes (j) of multiple IP address nodes (i) of the plurality of IP address nodes (i).

* * * * *